US012545068B2

United States Patent
Tanaka et al.

(10) Patent No.: US 12,545,068 B2
(45) Date of Patent: Feb. 10, 2026

(54) SHOCK ABSORBER

(71) Applicant: KYB Corporation, Tokyo (JP)

(72) Inventors: Kazumasa Tanaka, Tokyo (JP); Naoki Yasukouchi, Tokyo (JP); Dawei Li, Tokyo (JP)

(73) Assignee: KYB Corporation, Tokyo (JP)

( * ) Notice: Subject to any disclaimer, the term of this patent is extended or adjusted under 35 U.S.C. 154(b) by 401 days.

(21) Appl. No.: 18/023,983

(22) PCT Filed: Oct. 7, 2021

(86) PCT No.: PCT/JP2021/037201
§ 371 (c)(1),
(2) Date: Feb. 28, 2023

(87) PCT Pub. No.: WO2022/113537
PCT Pub. Date: Jun. 2, 2022

(65) Prior Publication Data
US 2023/0331054 A1   Oct. 19, 2023

(30) Foreign Application Priority Data
Nov. 25, 2020   (JP) .................. 2020-194815

(51) Int. Cl.
B60G 13/08   (2006.01)
B60G 13/00   (2006.01)

(52) U.S. Cl.
CPC ........... B60G 13/005 (2013.01); B60G 13/08 (2013.01)

(58) Field of Classification Search
CPC ..................... B60G 13/005; B60G 13/08
(Continued)

(56) References Cited

U.S. PATENT DOCUMENTS 7,022,932 B2 *   4/2006   Hatakeyama ........ B60G 13/006
                                                    219/61
7,793,971 B2 *   9/2010   Sakashita .................. F16F 9/54
                                                    188/322.19
2007/0267260 A1   11/2007   Sakashita et al.

FOREIGN PATENT DOCUMENTS

JP   H092034 A   *   1/1997   ............... B60G 7/00
JP   H10-119527 A      5/1998
(Continued)

OTHER PUBLICATIONS

Mar. 5, 2024, Japanese Office Action issued for related JP Application No. 2020-194815.
(Continued)

Primary Examiner — Christopher P Schwartz
(74) Attorney, Agent, or Firm — Paratus Law Group, PLLC

(57) ABSTRACT

An object of the present invention is to provide a shock absorber that can use a single bracket regardless of difference in thickness of a knuckle bracket. A shock absorber according to the present invention includes: a shock absorber main body having an outer shell and a rod movably inserted into the outer shell; a knuckle bracket attached to an outer circumference on a bottom end side of the outer shell; and a bracket including a curved piece curved along a circumferential direction of an outer circumference of the outer shell and an attachment piece extending from the curved piece and to which a mounting component is attached, the curved piece including a bracket attached to the outer shell by being welded to the outer circumference of the outer shell and within a range from a top end to a bottom end of the knuckle bracket in an axial direction of the outer shell.

6 Claims, 5 Drawing Sheets

(58) Field of Classification Search
USPC .................................... 188/321.11, 322.19
See application file for complete search history.

(56) References Cited

FOREIGN PATENT DOCUMENTS

| | | |
|---|---|---|
| JP | H11-294512 A | 10/1999 |
| JP | 2007-309482 A | 11/2007 |
| JP | 2014-058220 A | 4/2014 |
| JP | 2019-105342 A | 6/2019 |
| JP | 2020-041571 A | 3/2020 |

OTHER PUBLICATIONS

Dec. 25, 2025, Chinese Office Action issued for related CN Application No. 202180061595.X.

* cited by examiner

SHOCK ABSORBER

CROSS REFERENCE TO PRIOR APPLICATION

This application is a National Stage Patent Application of PCT International Patent Application No. PCT/JP2021/037201 (filed on Oct. 7, 2021) under 35 U.S.C. § 371, which claims priority to Japanese Patent Application No. 2020-194815 (filed on Nov. 25, 2020), which are all hereby incorporated by reference in their entirety.

TECHNICAL FIELD

The present invention relates to a shock absorber.

BACKGROUND ART

A shock absorber includes an outer shell and a rod that is movably inserted into the outer shell, and is used by being incorporated in a suspension in a vehicle, for example, to suppress the vibration of the vehicle body and the wheel. As the piston rod moves in the axial directions with respect to the outer shell, the shock absorber becomes extended and contracted, and exert a damping force thereby.

When such a shock absorber incorporated in a suspension is used in a strut suspension, for example, the shock absorber includes a knuckle bracket attached to the bottom end of the outer shell by welding and coupled to a knuckle holding a wheel of the vehicle.

Such a knuckle bracket includes, for example, a cylindrical holding portion having a C-shaped cross section and that holds an outer circumference of the outer shell; and a pair of attachment portions that are can be coupled to the knuckle, and that extends radially outwards, and in parallel with each other, from two respective circumferential ends of the holding portion.

In addition, the shock absorber may include a bracket for attaching a mounting component such as a brake hose or sensors for supplying hydraulic pressure for driving a piston of a caliper in the braking device separately from the knuckle bracket. In such a shock absorber, as disclosed in JP 2019-105342 A, the bracket may be welded to the outer circumference of the holding portion of the knuckle bracket and attached to the shock absorber main body.

CITATION LIST

Patent Literature

Patent Literature 1: JP 2019-105342 A

SUMMARY OF INVENTION

Technical Problem

More specifically, the bracket is formed by bending a base material, and includes a base portion welded to a holding portion of the knuckle bracket and a distal end portion extending from the base portion and to which a mounting component is attached.

A base portion of the bracket is curved along an outer circumference of a holding portion of the knuckle bracket, and is joined to the holding portion by projection welding. That is, the bracket is welded to the knuckle bracket along the circumferential direction of the holding portion with the curved base portion.

A shock absorber including a knuckle bracket constitutes a suspension in a vehicle to position a wheel, and a load is input to the knuckle bracket from the wheel side. Therefore, the knuckle bracket is designed to withstand a load determined in advance according to the specification of the vehicle to which the shock absorber is applied, and the thickness of the holding portion varies according to the vehicle type.

Here, for the outer shell having the same diameter, when there are two types of knuckle brackets applied to the shock absorber according to the specifications of the vehicle, such as a knuckle bracket having a thin thickness and a knuckle bracket having a thick thickness, the holding portion of the knuckle bracket having a thick thickness has a larger diameter (outer diameter) of the outer circumference than the holding portion of the knuckle bracket having a thin thickness.

As described above, the inner circumference of the base portion of the bracket needs to have a curved shape with substantially the same curvature as the outer circumference of the holding portion and to have a shape entirely along the outer circumference of the holding portion in terms of being joined to the holding portion by welding.

However, as described above, the holding portion of the knuckle bracket having a thin thickness and the holding portion of the knuckle bracket having a thick thickness have different outer diameters, and the inner circumference of the base portion of the bracket adapted to the holding portion having a thin thickness has a curvature different from that of the holding portion having a thick thickness. Therefore, the inner circumference does not fit closely along the outer circumference of the holding portion having a thick thickness, and a large gap is generated. As described above, when a large gap is generated between the base portion and the holding portion, the base portion and the holding portion cannot be firmly welded to each other. Therefore, it is necessary to prepare a plurality of brackets including base portions having different curvatures depending on the thickness of the knuckle bracket.

As described above, in the conventional shock absorber, when there are a plurality of types of knuckle brackets having different thicknesses, it is necessary to prepare a plurality of corresponding brackets for each thickness, and there is a problem that management of the brackets becomes complicated.

Therefore, an object of the present invention is to provide a shock absorber that can use a single bracket regardless of the difference in thickness of the knuckle bracket.

In order to solve the above-described problems, a shock absorber of the present invention includes a shock absorber main body having an outer shell and a rod movably inserted into the outer shell; a knuckle bracket attached to an outer circumference on a bottom end side of the outer shell; and a bracket including a curved piece curved along a circumferential direction of an outer circumference of the outer shell and an attachment piece extending from the curved piece and to which a mounting component is attached, the curved piece including a bracket welded to the outer circumference of the outer shell and within a range from a top end to a bottom end of the knuckle bracket in an axial direction of the outer shell.

According to the shock absorber configured as described above, the curved piece of the bracket is directly attached to the outer circumference of the outer shell and within the range from the top end to the bottom end of the knuckle bracket by welding. Therefore, the curvature of the curved piece of the bracket may be set based only on the outer diameter of the outer shell, and is not affected at all by the change in the thickness of the knuckle bracket attached to the outer shell. In addition, since the mounting position of the bracket is at the outer circumference of the outer shell and within the range from the top end to the bottom end of the knuckle bracket, even if the attachment piece is disposed at the similar position as the conventional shock absorber, the mounting attachment is in close proximity to the curved piece welded to the outer shell, in a manner that the strength of the bracket does not decrease.

BRIEF DESCRIPTION OF DRAWINGS

FIG. 4(*b*) is a bottom view of a shock absorber according to a modification of an embodiment.

DESCRIPTION OF EMBODIMENTS

Figure 1:
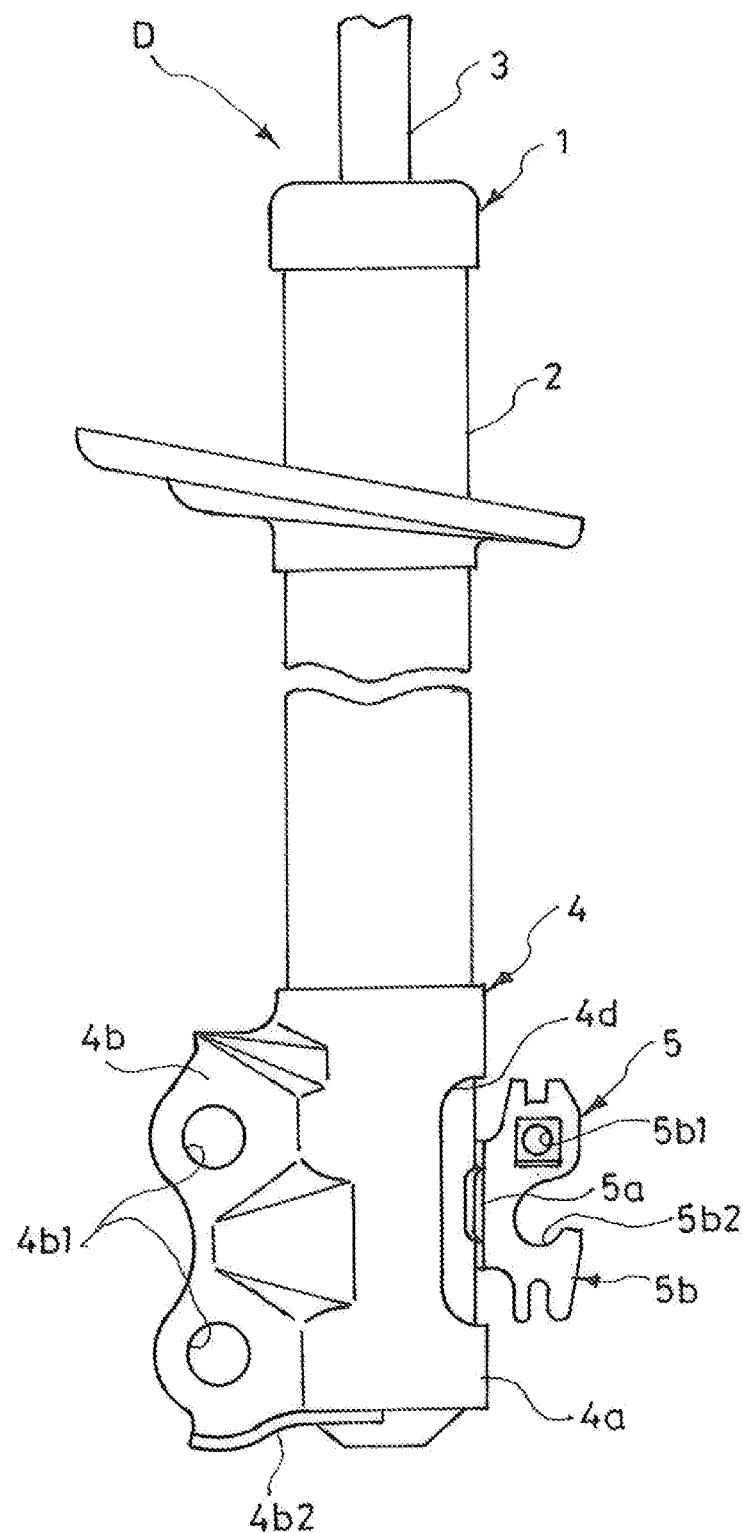
FIG. 1 is a side view of a shock absorber according to an embodiment.
Figure 2:
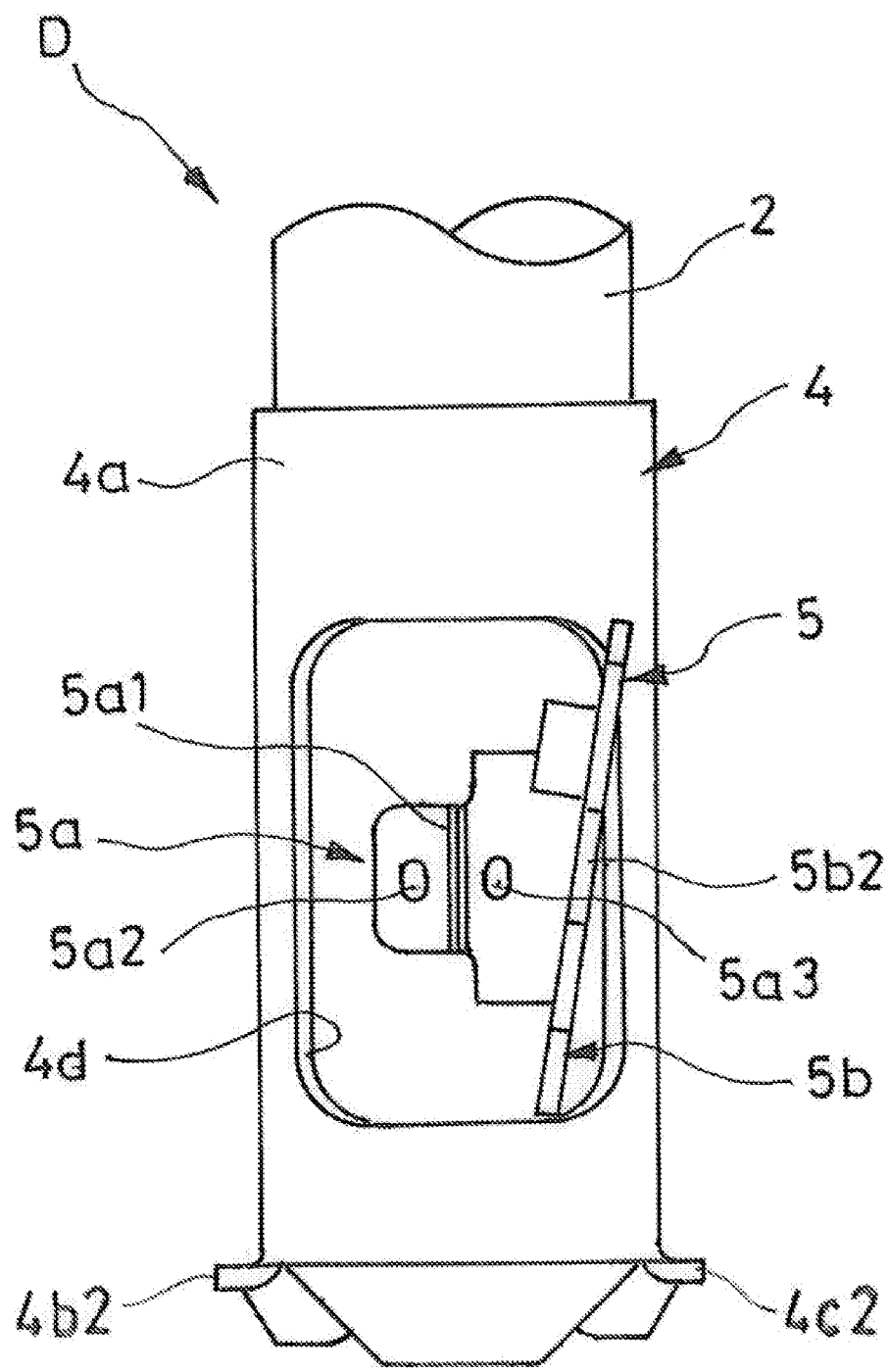
FIG. 2 is a rear view of a shock absorber according to an embodiment.

The present invention will now be explained based on the embodiment illustrated in drawings. As illustrated in FIGS. 1 and 2, a shock absorber D includes a shock absorber main body 1 having an outer shell 2 and a rod 3 that is movably inserted into the outer shell 2, a knuckle bracket 4 that is attached to an outer circumference of the bottom end side of the outer shell 2, and a bracket 5 that is welded to the outer circumference of the outer shell 2, and is interposed between a vehicle body and a wheel of the vehicle by being coupled to a knuckle that supports the wheel (not illustrated) in the vehicle using that uses the knuckle bracket 4.

Each part of the shock absorber D will now be explained in detail. The shock absorber main body 1 includes the cylindrical outer shell 2 and the rod 3 that is movably inserted into the outer shell 2, and dampens the vibration of the vehicle body and the wheel, by generating a damping force for inhibiting a relative movement of the rod 3 with respect to the outer shell 2, through an extending and contracting movement, in which the rod 3 moves relatively with respect to the outer shell 2 in the axial directions.

Figure 5:
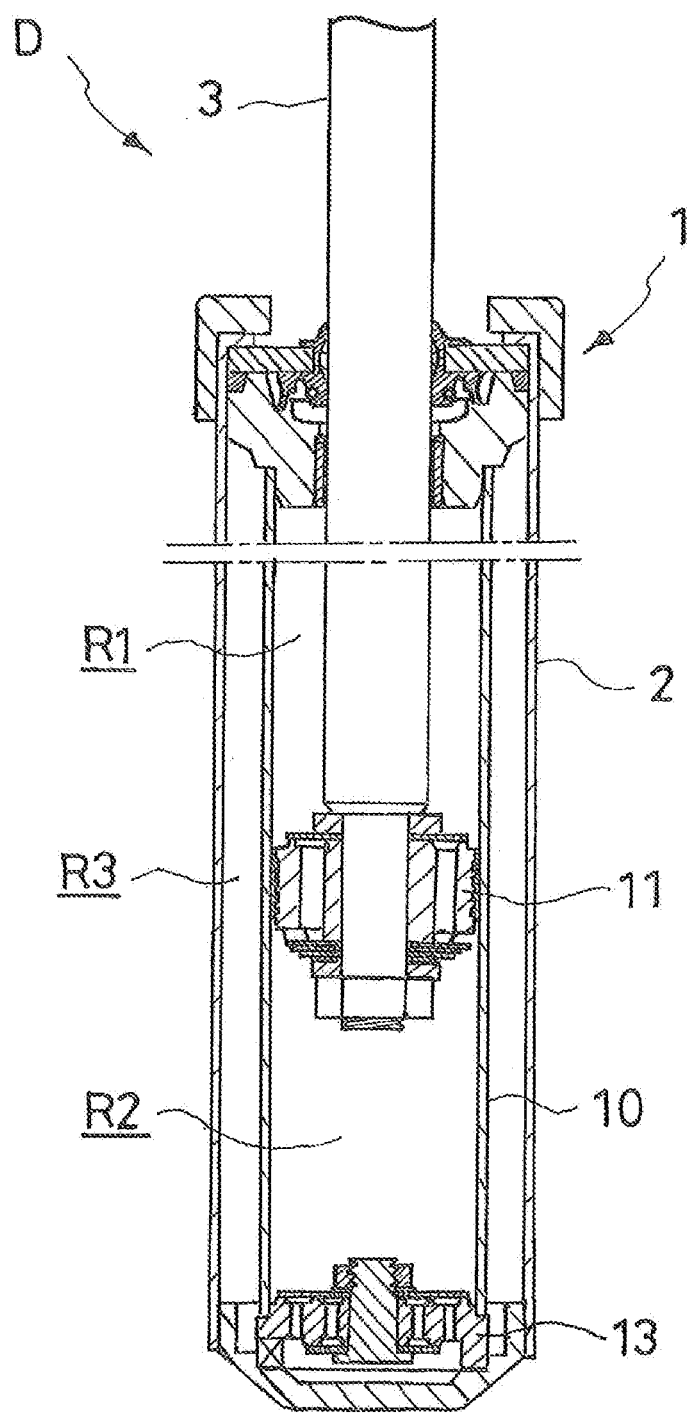
FIG. 5 is a cross-sectional view of a shock absorber according to an embodiment.

The shock absorber main body 1 includes, as illustrated in FIG. 5, the cylindrical outer shell 2 the bottom end of which is closed, a cylinder 10 that is housed inside the outer shell 2, the rod 3 that is movably inserted into the cylinder 10, a piston 11 coupled to the rod 3 and inserted into the cylinder 10 to partition the internal space of the cylinder 10 into an extension side chamber R1 and a compression side chamber R2, a reservoir R3 that is formed between the cylinder 10 and the outer shell 2, and a valve case 12 that is provided at the bottom end of the cylinder 10 to provide a partition between the compression side chamber R2 and the reservoir R3. The extension side chamber R1 and the compression side chamber R2 are filled with liquid such as hydraulic oil, and the reservoir R3 is filled with liquid and gas. Note that liquid other than the hydraulic oil such as water and an aqueous solution may also be used as the liquid used in the shock absorber D. Note that, in FIG. 5, the knuckle bracket 4 and the bracket 5 are omitted.

In addition, a passage where the extension side chamber communicates with the compression side chamber and a passage where the compression side chamber communicates with the reservoir are provided, and damping valves are provided in the passages, respectively. In the shock absorber main body 1 having the configuration described above, during its extending and contracting movement, the extension side chamber and the compression side chamber are expanded and compressed by the piston, and the liquid moves through the passages. The damping valve generates a damping force by resisting the liquid flow.

The knuckle bracket 4 is formed by bending a single piece of a metal base material. The knuckle bracket 4 includes a holding portion 4*a* that has a cylindrical shape with a C-shaped cross section and that holds the outer circumference of the outer shell 2, and a pair of coupling portions 4*b* and 4*c* that extends radially outwards, and in parallel with each other, from the two respective circumferential ends of the holding portion 4*a*, and that can be coupled to the knuckle in the vehicle (not illustrated). The holding portion 4*a* is welded along the outer circumference of the outer shell 2 and joined to the outer circumference of the outer shell 2.

Figure 3:
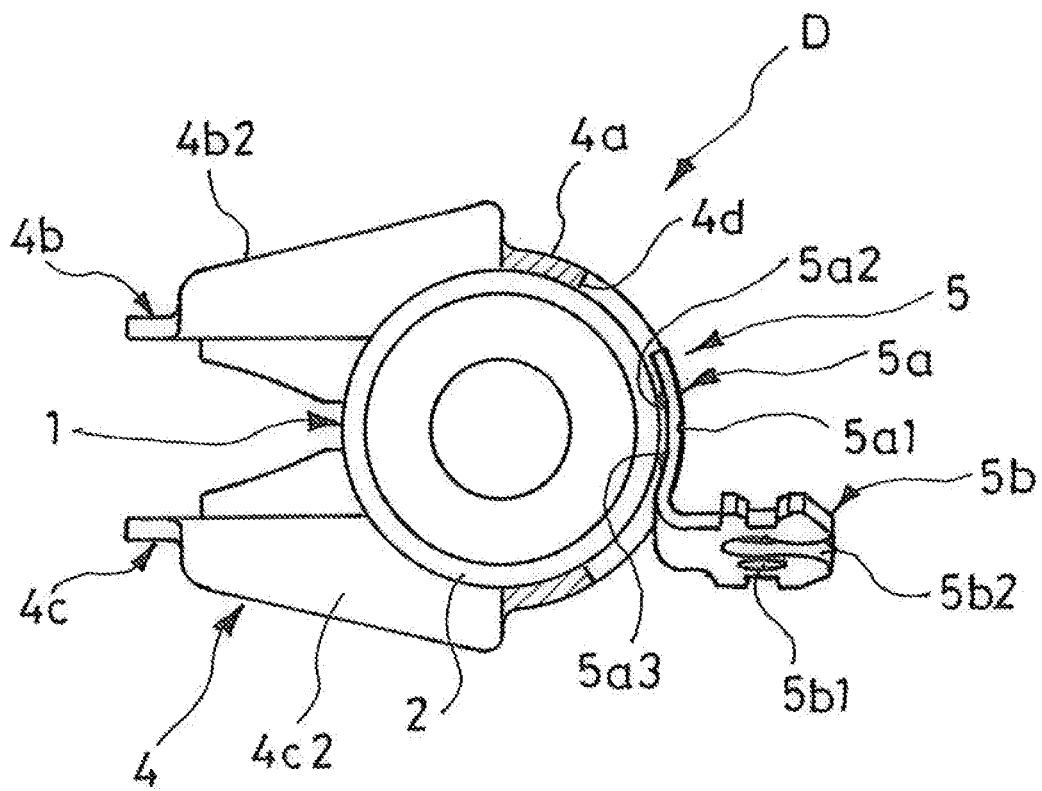
FIG. 3 is a bottom view of a shock absorber according to an embodiment.

As illustrated in FIGS. 1 to 3, the holding portion 4*a* has a cylindrical shape having a C-shaped cross section, with a split on the front side, and has a rectangular cutout 4*d* at the center of the rear side in a view from the front side. Since the knuckle bracket 4 includes the cutout 4*d*, the weight of the knuckle bracket 4 is reduced.

In addition, the coupling portions 4*b* and 4*c* extend radially outwards from the two respective circumferential ends of the holding portion 4*a*, in parallel with each other and facing each other. Each of the coupling portions 4*b* and 4*c* has two bolt insertion holes 4*b*1 and 4*c*1 at positions facing two respective holes that are provided in an attachment portion of the knuckle (not illustrated). The knuckle bracket 4 can be attached to the knuckle, by inserting the attachment portion of the knuckle between the coupling portions 4*b* and 4*c*, and bolt-fastening the coupling portions 4*b* and 4*c* to the attachment portion, with bolts and nuts (not illustrated) that are passed through the attachment portion of the knuckle and are inserted into the bolt insertion holes 4*b*1 and 4*cl*, respectively. Note that the bottom ends of the coupling portions 4*b* and 4*c* are bent outwards to provide flange portions 4*b*2 and 4*c*2, improving the strength of the coupling portions 4*b* and 4*c*.

The bracket 5 is joined to a portion facing the cutout 4*d* provided on the outer circumference of the outer shell 2 and on the back surface side of the holding portion 4*a* of the knuckle bracket 4 by projection welding.

Specifically, the bracket 5 includes a curved piece 5*a* curved along the circumferential direction of the outer circumference of the outer shell 2, and an attachment piece 5*b* extending from the curved piece 5*a* and to which a mounting component such as a brake hose or sensors of a vehicle (not illustrated) is attached.

The curved piece 5*a* has a convex shape in which top and bottom ends in the axial direction of the outer shell 2 are cut out on the distal end side in the circumferential direction, and includes a groove 5*al* formed along the axial direction at the center in the circumferential direction, and a pair of protrusions 5*a*2 and 5*a*3 protruding towards the side of the outer shell 2 at positions to be line targets on two sides in the circumferential direction of the groove 5*a*1 with the groove 5*a*1 as the center.

In addition, the attachment piece 5*b* is connected to a proximal end of the curved piece 5*a* in the circumferential direction. As shown in FIGS. 1 to 3, the attachment piece 5*b* is bent from the proximal end in the circumferential direction of the curved piece 5*a* and extends away from the outer shell 2, and includes a hole 5*b*1 and a cutout 5*b*2 for mounting a mounting component (not shown). The shape of the attachment piece 5*b* can be appropriately modified in design including the presence or absence of the hole 5*b*1 and the cutout 5*b*2 according to the shape of the mounting component to be mounted. Note that the bracket 5 is formed by bending a plate-shaped base material by press working and the like, and the curved piece 5*a* and the attachment piece 5*b* are formed by the above working.

In the bracket 5 configured as described above, after the knuckle bracket 4 is attached to the outer circumference of the outer shell 2 by welding, the protrusions 5*a*2 and 5*a*3 are directly brought into contact with the outer shell 2 while the curved piece 5*a* is disposed on the outer circumference of the outer shell 2 along the circumferential direction through the cutout 4*d* of the knuckle bracket 4. Since the groove 5*a*l along the axial direction is provided in the curved piece 5*a* when the bracket 5 is positioned on the outer circumference of the outer shell 2, if the bracket 5 is positioned in a manner that the groove 5*a*l is in the axial direction of the outer shell 2, the curved piece 5*a* of the bracket 5 can be positioned to be in an appropriate posture on the outer circumference of the outer shell 2 without being inclined with respect to the axis of the outer shell 2.

In this state, while the protrusions 5*a*2 and 5*a*3 of the bracket 5 are pressed against the outer shell 2, the bracket 5 and the outer shell 2 are energized to projection-weld the bracket 5 to the outer shell 2.

The bracket 5 is attached to the outer shell 2 by welding the curved piece 5*a* to the outer circumference of the outer shell 2 and within the range from the top end to the bottom end of the knuckle bracket 4 in FIG. 1 in the axial direction of the outer shell 2. Therefore, in the bracket 5, the attachment piece 5*b* can be disposed at the same position as the conventional shock absorber attached to the outer circumference of the holding portion 4*a* of the knuckle bracket 4, and the curved piece 5*a* in close proximity to the attachment piece 5*b* can be directly joined to the outer circumference of the outer shell 2. Note that since the curved piece 5*a* may be welded that a part of it is disposed on the outer circumference of the outer shell 2 and within the range from the top end to the bottom end in FIG. 1 of the knuckle bracket 4 in the axial direction of the outer shell 2, the definition that the curved piece 5*a* is welded within the range includes not only the mode in which the entire curved piece 5*a* is welded within the range but also the mode in which at least a part of the curved piece 5*a* is disposed within the range and welded.

As described above, the shock absorber D of the present embodiment includes the shock absorber main body 1 having the outer shell 2 and the rod 3 movably inserted into the outer shell 2; the knuckle bracket 4 attached to an outer circumference on a bottom end side of the outer shell 2; and the bracket 5 including the curved piece 5*a* curved along a circumferential direction of an outer circumference of the outer shell 2 and the attachment piece 5*b* extending from the curved piece 5*a* and to which a mounting component is attached, the curved piece 5*a* including the bracket 5 welded to the outer circumference of the outer shell 2 and within a range from a top end to a bottom end of the knuckle bracket 4 in an axial direction of the outer shell 2.

According to the shock absorber D configured as described above, the curved piece 5*a* of the bracket 5 is directly attached to the outer circumference of the outer shell 2 and within the range from the top end to the bottom end of the knuckle bracket 4 by welding. Therefore, the curvature of the curved piece 5*a* of the bracket 5 may be set based only on the outer diameter of the outer shell 2, and is not affected at all by the change in the thickness of the knuckle bracket 4 attached to the outer shell 2. In addition, since the mounting position of the bracket 5 is at the outer circumference of the outer shell 2 and within the range from the top end to the bottom end of the knuckle bracket 4, even if the attachment piece 5*b* is disposed at the similar position as the conventional shock absorber, the attachment piece 5*b* is in close proximity to the curved piece 5*a* welded to the outer shell 2, in a manner that the strength of the bracket 5 does not decrease. As described above, according to the shock absorber D of the present embodiment, the single bracket 5 can be used regardless of the difference in thickness of the knuckle bracket 4 attached to the outer shell 2.

In addition, the knuckle bracket 4 in the shock absorber D of the present embodiment includes the holding portion 4*a* that has a cylindrical shape with a C-shaped cross section with a split on the front side and holds the outer circumference of the outer shell 2, the pair of coupling portions 4*b* and 4*c* that extends radially outwards, and in parallel with each other, from the two respective circumferential ends of the holding portion 4*a*, and that can be coupled to the knuckle in the vehicle (not illustrated), and the cutout 4*d* provided on the back surface side of the holding portion 4*a*. The bracket 5 is attached by welding a curved piece 5*a* to the outer circumference of the outer shell 2 facing the cutout 4*d*.

In the shock absorber D configured as described above, since the curved piece 5*a* is welded to the outer circumference of the outer shell 2 viewed from the cutout 4*d* provided to reduce the weight of the knuckle bracket 4, the bracket 5 can be automatically welded to the outer circumference of the outer shell 2 and within the range from the top end to the bottom end of the knuckle bracket 4 when disposed in the cutout 4*d*. Therefore, according to the shock absorber D configured as described above, the weight of the shock absorber D can be reduced, and the positioning work of the bracket 5 is also facilitated.

In addition, since the groove 5*a*1 is provided along the axial direction on the outer circumferential side of the curved piece 5*a* of the bracket 5 in the shock absorber D of the present embodiment, the curved piece 5*a* of the bracket 5 can be easily positioned to be in an appropriate posture on the outer circumference of the outer shell 2 using the groove 5*a*l as a mark, and the operator can visually and easily check a product in which the bracket 5 is attached to the outer shell 2 in an inclined manner after welding of the bracket 5. Note that, in the shock absorber D of the present embodiment, the groove 5*a*l is engraved in the curved piece 5*a*, but a mark may be written in the curved piece 5*a* instead of the groove 5*a*l, or the mark may be provided by coating. However, since the bracket 5 is molded by press working and the like, the groove 5*a*l can be engraved on the curved piece 5*a* together with the protrusions 5*a*2 and 5*a*3 at the time of molding the curved piece 5*a*, which is advantageous in that operations such as writing of marks and coating can be omitted.

Furthermore, in the shock absorber D of the present embodiment, the protrusions 5*a*2 and 5*a*3 of the curved piece 5*a* are provided in a manner that only the protrusions 5*a*2 and 5*a*3 abut on the outer shell 2, and current can be concentrated on the protrusions 5*a*2 and 5*a*3 during projection welding, in a manner that the bracket 5 can be favorably joined to the outer shell 2. Note that, when the curved piece 5*a* is arc-welded to the outer shell 2, it is not necessary to provide the protrusions 5*a*2 and 5*a*3, and the entire inner circumference of the curved piece 5a may abut on the outer circumference of the outer shell 2.

Figure 4:
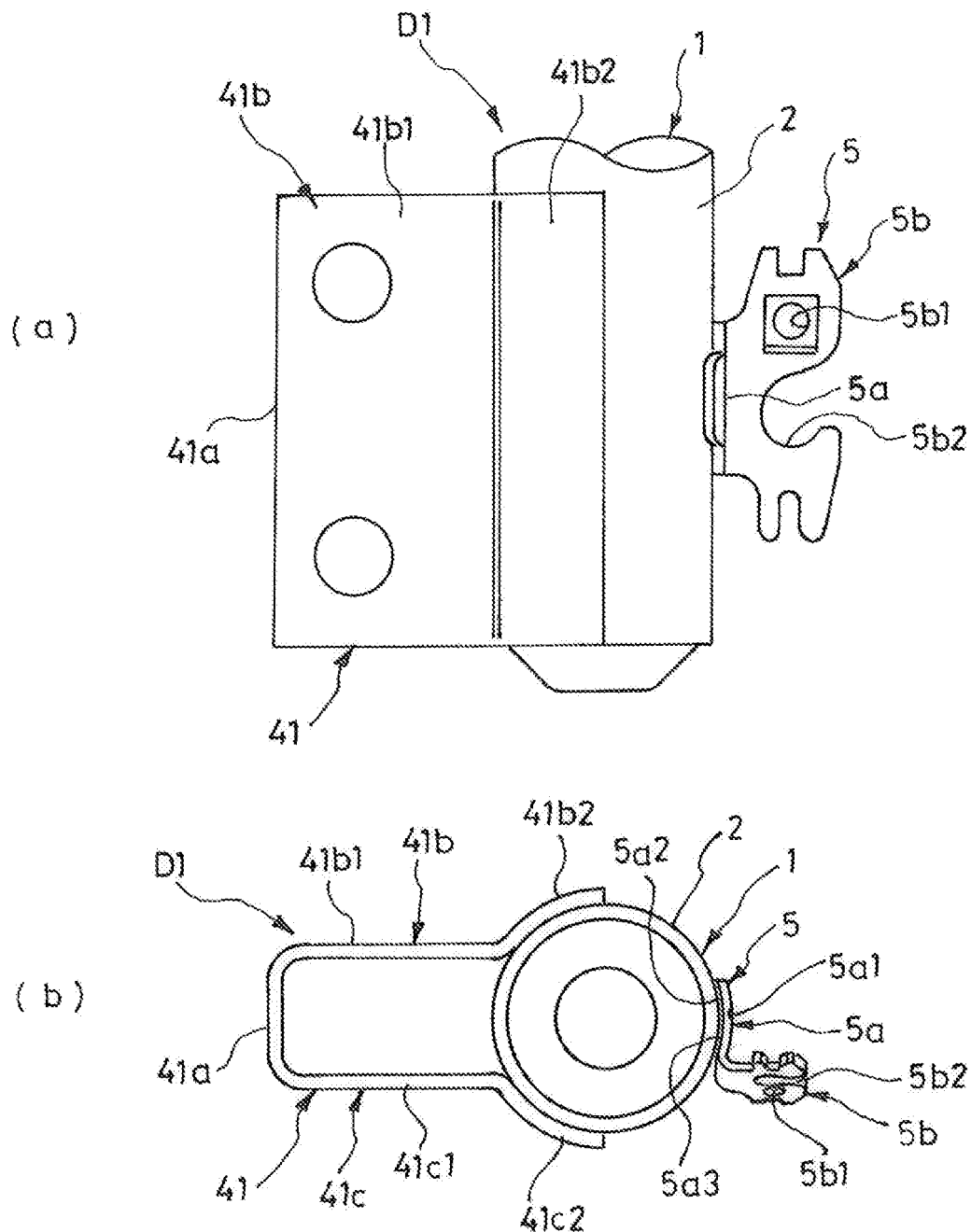
FIG. 4(*a*) is a side view of a shock absorber according to a modification of an embodiment.

Note that, when the knuckle bracket 4 is attached to the outer shell 2, the knuckle bracket 4 only needs to form a portion that is not covered by the knuckle bracket 4 and exposed to the outside in the outer circumference of the outer shell 2 and in the range from the top end to the bottom end of the knuckle bracket 4. Therefore, the cutout 4d in the holding portion 4a of the knuckle bracket 4 may not have a hole shape but may communicate with the top end or the bottom end of the holding portion 4a. In addition, a knuckle bracket 41 may be configured as follows, like the shock absorber D1 in one modification illustrated in FIG. 4.

Specifically, the knuckle bracket 41 may have a rectangular facing portion 41a facing the side portion of the outer shell 2, and a pair of coupling portions 41b and 41c extending from two ends of the facing portion 41a in the direction perpendicular to the axis of the outer shell 2 towards the side of the outer shell 2 and sandwiching the outer shell 2 in the radial direction. The coupling portions 41b and 41c include straight portions 41b1 and 41c1 extending in parallel to each other from the facing portion 41a towards the side of the outer shell 2, and curved portions 41b2 and 41c2 that are continuous with the straight portions 41b1 and 41c1 and curved along the outer circumference of the outer shell 2 to sandwich the outer circumference of the outer shell 2 between. In the knuckle bracket 4, the curved portions 41b2 and 41c2 cover a half circumference of the outer shell 2, and distal ends of the curved portions 41b2 and 41c2 are welded to the outer circumference of the outer shell 2 along the axial direction. Therefore, the half of the outer shell 2 on the side opposite to the side of the knuckle bracket 41 is exposed without being covered by the knuckle bracket 41. The bracket 5 is welded to an exposed portion of the outer shell 2 that is not covered with the knuckle bracket 41. As described above, even if the knuckle bracket 41 is configured in a manner that the outer circumference of the outer shell 2 is exposed outward without being covered with the knuckle bracket 41 instead of including the cutout 4d, the curved piece 5a of the bracket 5 can be directly welded to the outer circumference of the outer shell 2 and in the range from the top end to the bottom end of the knuckle bracket 41. Therefore, even in the shock absorber D configured as described above, the single bracket 5 can be used regardless of the difference in thickness of the knuckle bracket 41. In addition, since the knuckle bracket 41 includes the facing portion 41a and the coupling portions 41b and 41c, it is possible to secure a wide space where the bracket 5 can be welded on the side opposite to the knuckle bracket 41 of the outer shell 2, and thus, it is easy to weld the bracket 5, and the number of types of available welding increases, in a manner that the degree of freedom in machining can be improved. Note that the knuckle bracket 41 may cover half or more of the circumference of the outer shell 2 on condition that welding of the bracket 5 to the outer shell 2 is not disturbed.

Although the preferred embodiment of the present invention has been described above in detail, modifications, variations, and changes are still possible without departing from the scope of the claims.

The invention claimed is:

1. A shock absorber comprising:
   a shock absorber main body having an outer shell and a rod movably inserted into the outer shell;
   a knuckle bracket attached to an outer circumference on a bottom end side of the outer shell; and
   a bracket including a curved piece curved along a circumferential direction of an outer circumference of the outer shell and an attachment piece extending from the curved piece and to which a mounting component is attached, the curved piece is welded to the outer circumference of the outer shell and within a range from a top end to a bottom end of the knuckle bracket in an axial direction of the outer shell.

2. The shock absorber according to claim 1, wherein
   the knuckle bracket includes a holding portion that has a cylindrical shape with a C-shaped cross section with a split on a front side and holds the outer circumference of the outer shell, a pair of coupling portions that extends radially outwards, and in parallel with each other, from two circumferential ends of the holding portion, and that can be coupled to a knuckle in a vehicle, and a cutout that is provided on a back surface side of the holding portion, and
   the bracket is attached by welding the curved piece to the outer circumference of the outer shell facing the cutout.

3. The shock absorber according to claim 1, wherein
   the bracket includes a groove formed along an axial direction on an outer circumference of the curved piece.

4. The shock absorber according to claim 1, comprising:
   a cylinder housed in the outer shell;
   a piston that partitions an inside of the cylinder into an extension side chamber and a compression side chamber;
   a reservoir formed between the cylinder and the outer shell; and
   a valve case that is provided at a bottom end of the cylinder and partitions the compression side chamber and the reservoir, wherein
   the rod is inserted into the cylinder and coupled to the piston.

5. The shock absorber according to claim 1, wherein
   the curved piece is welded at a position spaced apart from the knuckle bracket on the outer circumference of the outer shell.

6. The shock absorber according to claim 1, wherein
   the bracket is formed by pressing a plate-shaped base material, and
   the curved piece is projection-welded to the outer shell.

* * * * *